United States Patent
Leverger et al.

(10) Patent No.: US 10,124,744 B2
(45) Date of Patent: Nov. 13, 2018

(54) CLIP FOR FASTENING A PANEL ON A SUPPORT, METHOD FOR IMPLEMENTING SAME, AND MOTOR VEHICLE EQUIPMENT

(71) Applicant: ILLINOIS TOOL WORKS INC., Glenview, IL (US)

(72) Inventors: Eric Leverger, Epone (FR); Laurent Huet, Meru (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 209 days.

(21) Appl. No.: 15/303,790

(22) PCT Filed: Mar. 31, 2015

(86) PCT No.: PCT/US2015/023498
§ 371 (c)(1),
(2) Date: Oct. 13, 2016

(87) PCT Pub. No.: WO2015/160500
PCT Pub. Date: Oct. 22, 2015

(65) Prior Publication Data
US 2017/0036618 A1 Feb. 9, 2017

(30) Foreign Application Priority Data
Apr. 16, 2014 (FR) ...................... 14 53413

(51) Int. Cl.
*F16B 19/00* (2006.01)
*B60R 13/02* (2006.01)
(Continued)

(52) U.S. Cl.
CPC .......... *B60R 13/0206* (2013.01); *F16B 5/065* (2013.01); *F16B 21/02* (2013.01)

(58) Field of Classification Search
CPC ....... B60R 13/0206; F16B 5/065; F16B 21/02
See application file for complete search history.

(56) References Cited

U.S. PATENT DOCUMENTS 4,506,419 A * 3/1985 Mitomi .................. F16B 21/02
24/289
5,658,110 A * 8/1997 Kraus .................... B62D 25/24
411/508

(Continued)

FOREIGN PATENT DOCUMENTS

CN 1142019 A 2/1997
CN 101460748 A 6/2009
(Continued)

OTHER PUBLICATIONS

ISR and WO for PCT/US2015/023498 dated Jul. 9, 2015.
Search Report issued in French application No. 1453413 dated Jan. 14, 2015.

*Primary Examiner* — Jason W San
(74) *Attorney, Agent, or Firm* — Pilloff & Passino LLP; Martin J. Cosenza

(57) ABSTRACT

The present invention relates to a clip for fastening a panel on a support, in particular for an automobile equipment. The clip comprises a core and a cage forming two separate parts centered on a central axis. The core includes a head and a body. The body has an outer profile forming an helix, slender on either side of the inflection plane transverse to the central axis. The cage includes a base surrounding the head and a torsion bar housed in the core. The core and the torsion bar include complementary means for rotational securing around the central axis. The bar is elastically deformed during a rotation of the core around the central axis. The invention also relates to a method for implementing such a clip, as well as a motor vehicle comprising such a clip.

10 Claims, 10 Drawing Sheets

(51) Int. Cl.
*F16B 5/06* (2006.01)
*F16B 21/02* (2006.01)

(56) References Cited

U.S. PATENT DOCUMENTS

| | | | | |
|---|---|---|---|---|
| 6,039,523 | A * | 3/2000 | Kraus | F16B 5/0628 411/48 |
| 6,059,502 | A * | 5/2000 | Konig | F16B 37/043 411/182 |
| 6,322,305 | B1 * | 11/2001 | Bantle | F16B 12/14 411/182 |
| 6,974,292 | B2 * | 12/2005 | Hansen | F16B 21/086 24/458 |
| 8,591,160 | B2 * | 11/2013 | Shinozaki | F16B 5/0628 24/458 |
| 9,175,714 | B2 * | 11/2015 | Tremmel | F16B 37/04 |
| 9,963,087 | B2 * | 5/2018 | Leverger | B60R 13/0206 |
| 9,982,700 | B2 * | 5/2018 | Najima | F16B 19/10 |
| 2007/0258795 | A1 * | 11/2007 | Nakazato | F16B 5/065 411/508 |
| 2008/0145186 | A1 * | 6/2008 | Jin | F16B 5/065 411/480 |
| 2008/0219758 | A1 * | 9/2008 | Jatzke | B60R 13/0206 403/282 |
| 2009/0285648 | A1 * | 11/2009 | Gosis | B25B 31/00 411/22 |
| 2010/0050401 | A1 * | 3/2010 | Komeno | B60R 11/00 24/595.1 |
| 2010/0119325 | A1 * | 5/2010 | Edland | F16B 5/065 411/182 |
| 2012/0227226 | A1 * | 9/2012 | Sasaki | F16B 21/086 24/703.1 |
| 2013/0091669 | A1 * | 4/2013 | Sasaki | F16B 19/00 24/595.1 |
| 2013/0129450 | A1 * | 5/2013 | Aoki | B29C 45/44 411/509 |
| 2013/0136559 | A1 * | 5/2013 | Hauser | F16B 5/065 411/45 |

FOREIGN PATENT DOCUMENTS

| | | |
|---|---|---|
| CN | 102652228 A | 8/2012 |
| EP | 0921323 A2 | 6/1999 |
| EP | 0921323 B1 | 10/2001 |
| FR | 2789455 B1 | 4/2001 |
| FR | 2789455 A1 | 8/2008 |
| JP | 2001200818 A | 7/2001 |
| WO | 2008015511 A1 | 2/2008 |

\* cited by examiner

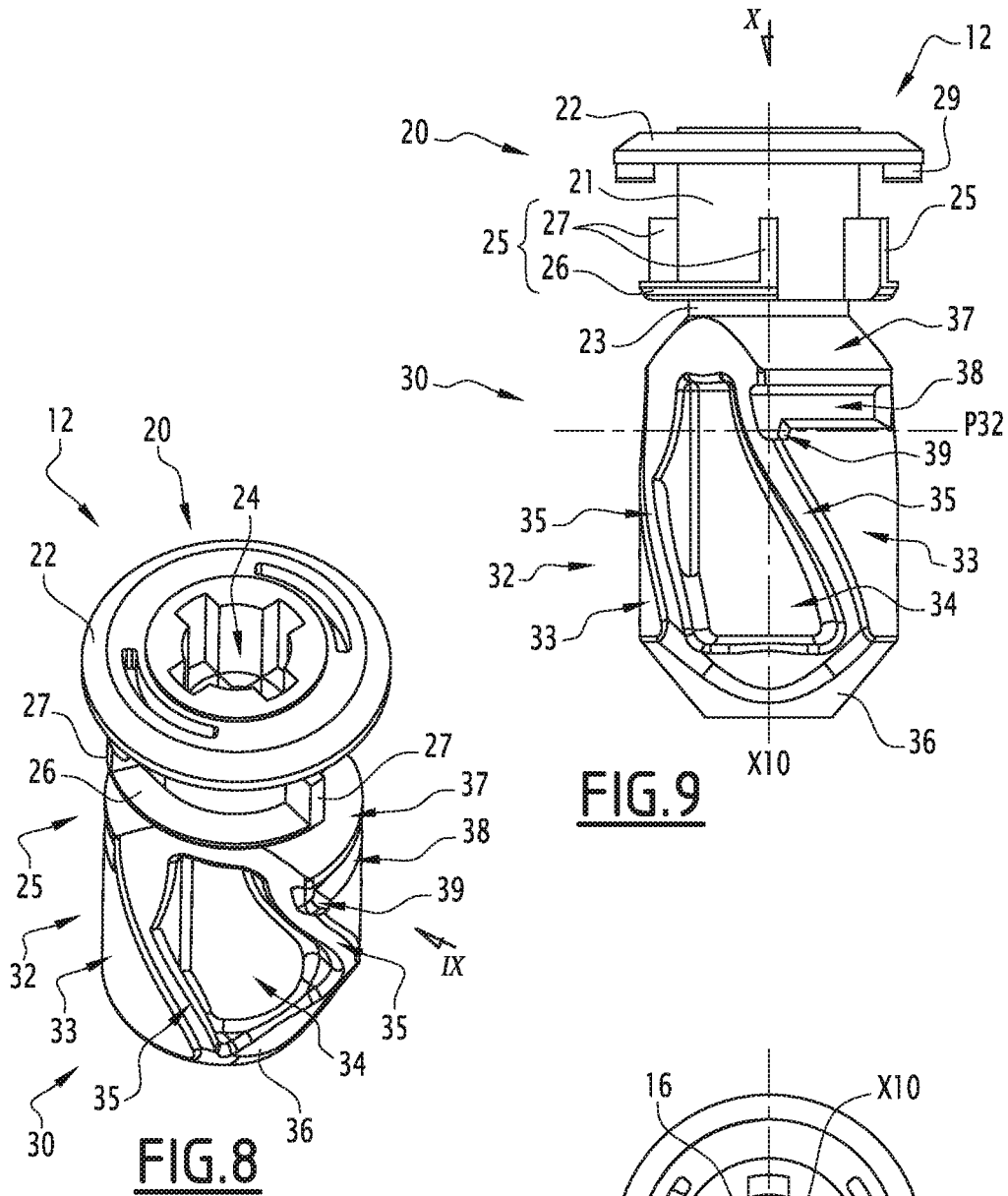
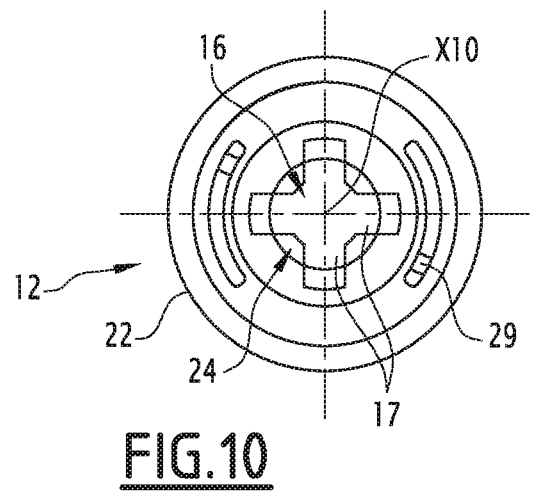

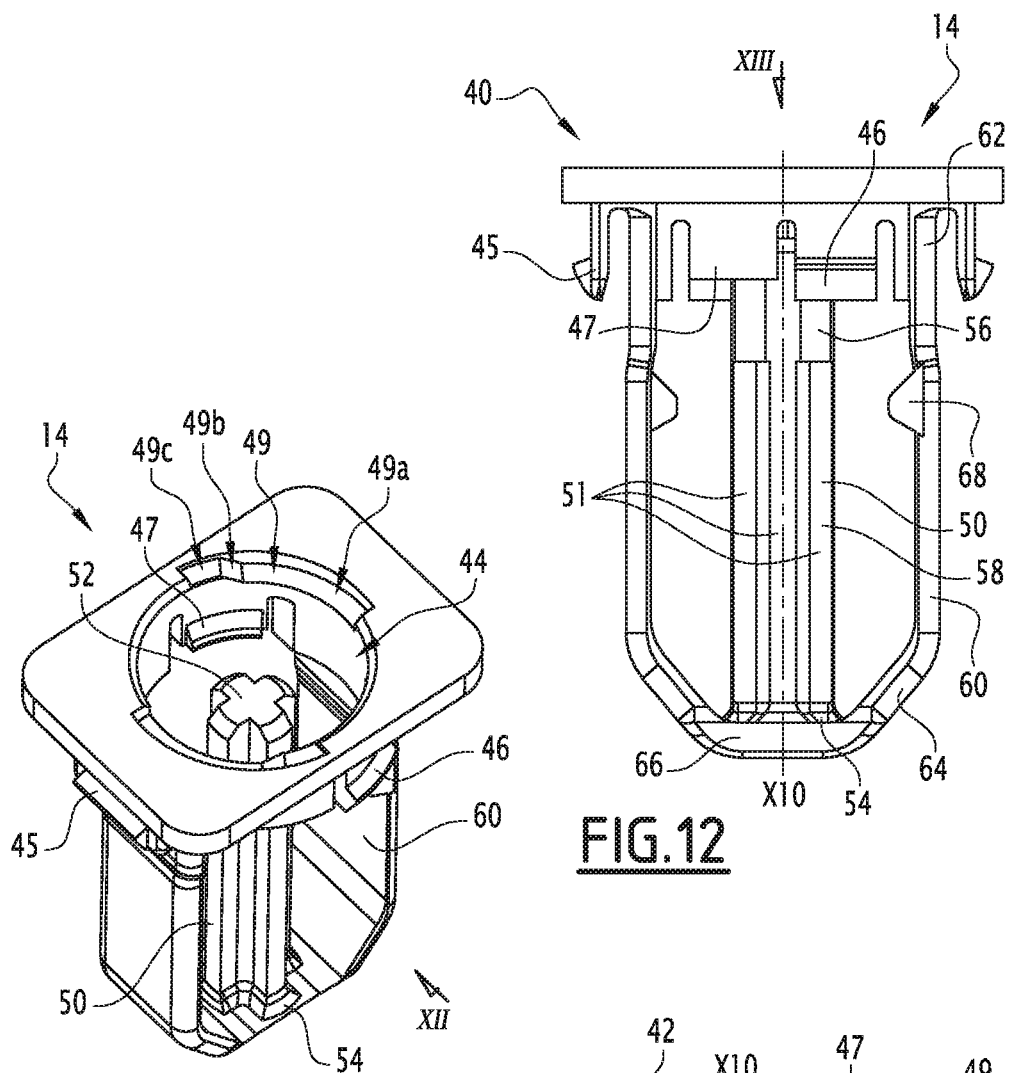
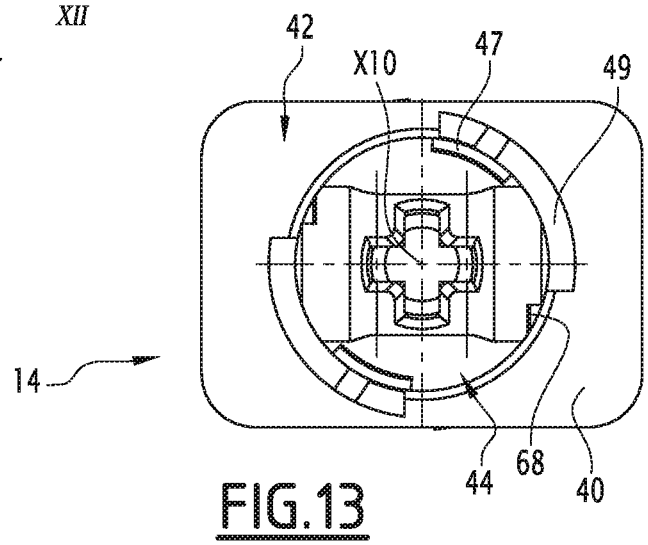
FIG.11
FIG.12
FIG.13

CLIP FOR FASTENING A PANEL ON A SUPPORT, METHOD FOR IMPLEMENTING SAME, AND MOTOR VEHICLE EQUIPMENT

RELATED APPLICATIONS

The present application is a National Phase of International Application Number PCT/US2015/023498 filed Mar. 31, 2015 and claims priority to French Application Number 1453413 filed Apr. 16, 2014.

The present invention relates to a clip for fastening a panel to a support, particularly in a motor vehicle. The invention also relates to a method for implementing such a fastening clip. The invention also relates to automobile equipment comprising a support, a panel and such a fastening clip.

In practice, it is known to use such a clip to replace a screwed system, notably for fastening vehicle interior linings or vehicle underbody pans. A screwed system for example comprises a piece made of plastic called a grommet and a screw made of metal. The grommet is assembled on the support, then the screw is screwed into this grommet, through the panel that is to be fastened, through the action of a screw driver.

FR-A-2 789 455 describes an example of a fastening clip, molded as a single piece from plastic. The clip comprises a rigid core and two curved flexible wings which are connected to the core. Each wing can flex in plastic deformation to allow the clip to be clipped into a hole in the panel.

WO-A-2008/015511 describes other examples of fastening clips, comprising a body and a finger forming two separate parts. The body comprises elastically deformable tabs at its lower end. When the finger is inserted into the body, the tabs spread on the sides.

EP-A-0 921 323 describes other examples of fastening clips, comprising at least two distinct parts. In one main embodiment, the clip comprises a core and a cage. The core comprises an upper part, a middle part and a lower part. The cage surrounds the middle part. The lower part is in the shape of a hollow truncated cone, which is elastically deformable.

It is an object of the present invention to provide an alternative form of fastening clip.

To this end, one subject of the invention is a clip for fastening a panel to a support, in particular for an automobile equipment, in which:
  the clip comprises a core and a cage forming two distinct parts centered on a central axis;
  the core includes a head and a body; characterized in that the body has an outer profile forming a helix, tapering on either side of an inflection plane transverse to the central axis;
  the cage includes a base surrounding the head and a torsion bar housed in the core;
  the core and the torsion bar include complementary means for securing in terms of rotation around the central axis; and
  the torsion bar is elastically deformed during a rotation of the core around the central axis.

Thus, the invention makes it possible to obtain a clip that is simple and practical to use, having improved mechanical strength, by choosing optimized materials for the core and for the cage. The clip can be prepositioned on the panel that is to be fastened, then to operated by simply clipping it onto the support. The clip can advantageously be substituted for a screwed system, thereby avoiding the use of a screw driver and allowing time to be saved during assembly. Furthermore, the use of a clip according to the invention is advantageous from an economic standpoint.

According to other advantageous features of the invention, considered in isolation or in combination:
  The head of the core and the base of the cage include complementary stop elements, limiting the relative rotation between the head and the base, while the torsion bar is elastically deformed and the core pivots around the central axis.
  The helix comprises raised portions and hollow portions that are connected by edges provided to slide against the support.
  The base includes hooks for clipping on the support.
  The clip includes a sealing collar fastened to the cage and provided to bear against the support.
  The clip includes a sealing gasket fastened to the core and positioned bearing against the cage.
  The cage comprises at least one arm, preferably two arms, connecting the base to a distal end of the torsion bar.
  The body of the core includes at least one slot provided to receive a lug formed on the arm or least one of the arms, preferably the body includes two slots provided each to receive a lug formed on one of the two arms.

Another subject of the invention is a method for implementing a clip as defined hereinabove. The method is characterized in that it comprises the following successive phases:
  a) a preparatory phase consisting of bringing a panel and a support closer together, each of them including an orifice for receiving the clip, which is inserted into the orifice of the panel;
  b) a fastening phase consisting of inserting the clip through the orifice of the support, this fastening phase comprising the following successive steps:
    b1) while the core passes through the orifice of the support, the helix is driven, upon contact with the support, in a first direction of rotation around the central axis and the torsion bar is elastically deformed around the central axis;
    b2) once the inflection plane of the helix has passed through the orifice of the support, the torsion bar is elastically deformed until it returns to its initial configuration, at the same time driving the core in a second direction that is the opposite of the first direction of rotation around the central axis.

According to a first embodiment of the preparatory phase, the clip is positioned on the panel, being inserted into the orifice in the panel, before the panel and the support are brought together.

According to a second embodiment of the preparatory phase, the clip is positioned on the panel and the support by being inserted through the orifices in the panel and in the support after the panel and the support have been brought together.

Another subject of the invention is an automobile equipment comprising at least: a support; a panel designed to be fastened to the support; and a fastening clip as defined hereinabove.

The invention will be better understood from reading the description which will follow, given solely by way of nonlimiting example and made with reference to the attached drawings in which:

FIG. 8 is a perspective view, showing only the core of the clip of FIGS. 1 to 7;

FIG. 9 is a side view on arrow IX of FIG. 8;

FIG. 10 is a view from above on arrow X of FIG. 9;

FIG. 11 is a perspective view showing only the cage of the clip of FIGS. 1 to 7;

FIG. 12 is a side view on arrow XII of FIG. 11;

FIG. 13 is a view from above on arrow XIII of FIG. 12;

Figure 1:
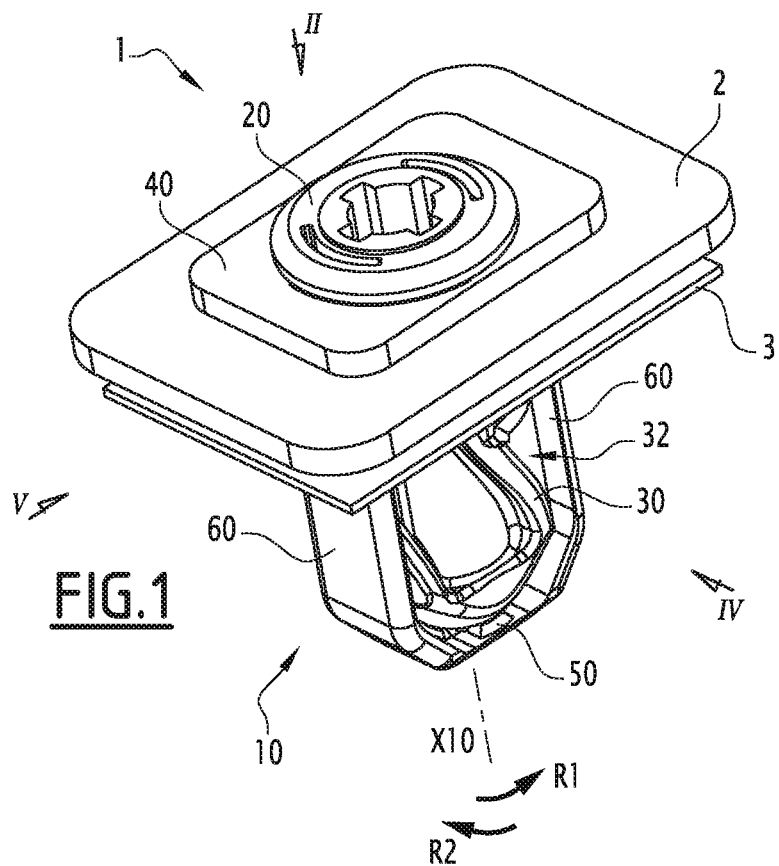
FIG. 1 is a perspective view of a clip according to the invention, comprising a core and a cage, shown in the active configuration in which it fastens a panel to a support, which items are depicted partially with a view to simplifying.
Figures 2, 3:
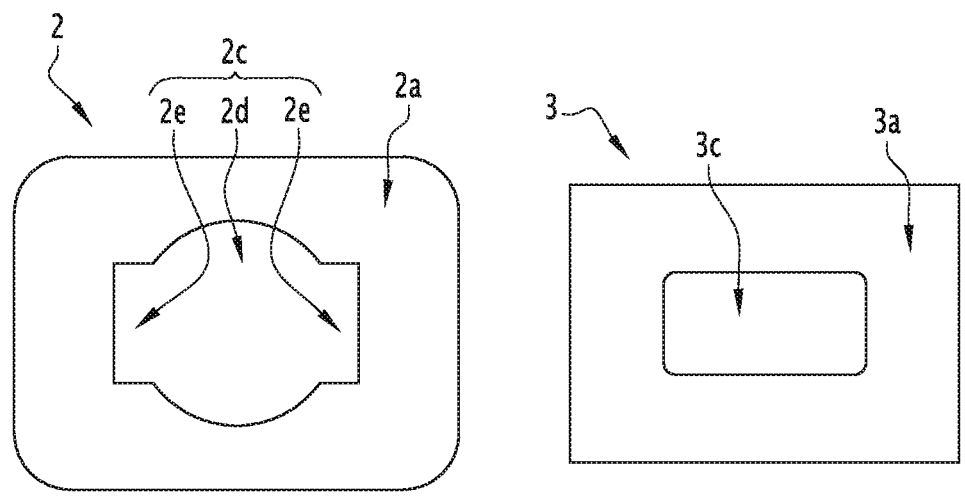
FIG. 2 is an elevation on arrow II of FIG. 1, showing the panel partially depicted.
FIG. 3 is a view similar to FIG. 2, showing the support partially depicted.
Figure 4:
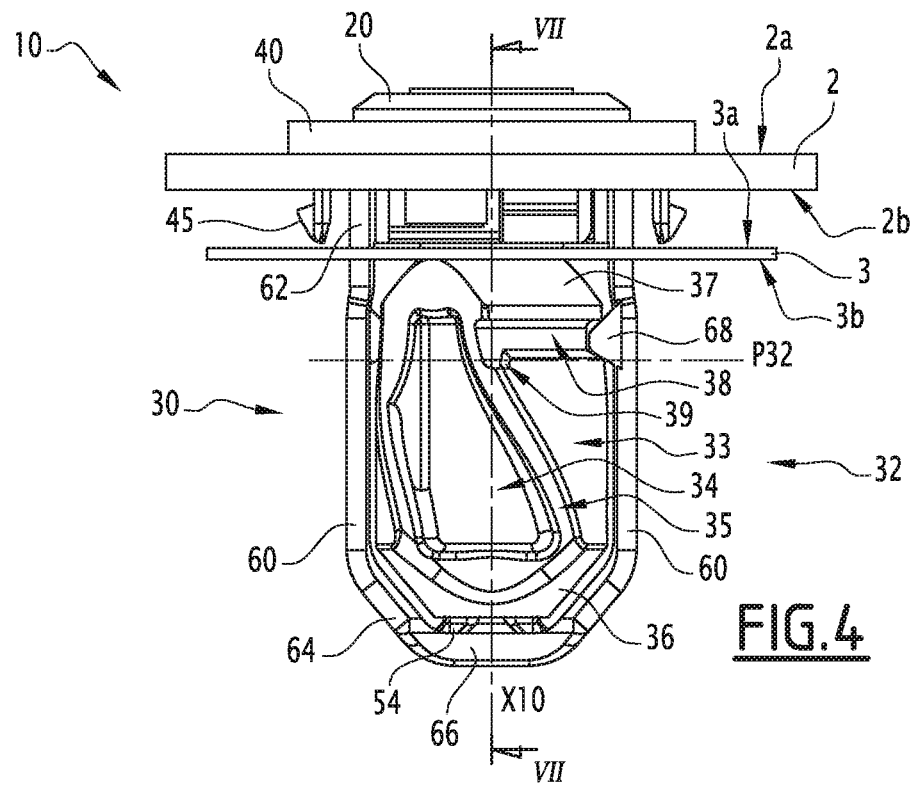
FIG. 4 is a side view on arrow IV of FIG. 1.
Figure 5:
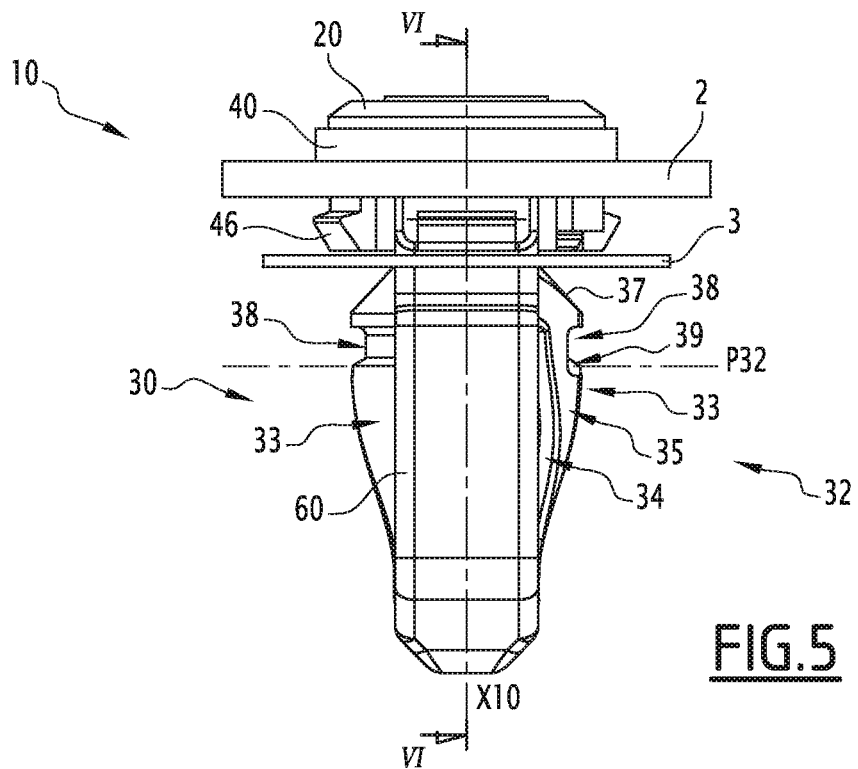
FIG. 5 is a side view on arrow V of FIG. 1.

FIGS. 1 to 13 depict automobile equipment 1 according to the invention, comprising a panel 2, a support 3 and a fastening clip 10, likewise according to the invention.

The equipment 1, the panel 2 and the support 3 have been depicted partially in FIGS. 1 to 7 for the sake of simplification. By way of nonlimiting example, the equipment 1 may be a motor vehicle door, the panel 2 is a lining panel and the support is a metal sheet.

The clip 10 is designed to fasten the panel 2 to the support 3. Depending on the intended application, the equipment 1 may comprise one or several clips 10 for fastening the panel 2 to the support 3.

The panel 2 comprises two opposite plane surfaces 2a and 2b, and a through-orifice 2c formed between the surfaces 2a and 2b. The orifice 2c has several parts 2d and 2e joined together, namely a central part 2d of rounded shape and two lateral parts 2e of rectangular shape. The orifice 2c is preferably formed through the panel 2 by punching or molding.

The support 3 comprises two opposite plane surfaces 3a and 3b, and a through-orifice 3c formed between the surfaces 3a and 3b. The orifice 3c has a rectangular shape with rounded internal corners. The orifice 3c is preferably formed through the support 3 by punching.

In practice, the panel 2 and the support 3 may have curved surfaces. For example, the panel 2 may have a concave surface 2a and a convex surface 2b.

The clip 10 comprises a core 12 and a cage 14, forming two separate parts. The core 12 may be made of polyamide (PA-6,6) with a glass-fiber reinforcement (30% by mass) while the cage 14 may be made of polyacetal, such as polyoxymethylene (POM) or of polyamide (PA-6,6). The core 12 is globally more rigid than the cage 14.

When the clip 10 is assembled, the core 12 and the cage 14 are centered on a central axis X10. The longitudinal direction of the clip 10 is defined parallel to this axis X10. The core 12 comprises a head 20 and a body 30 in the shape of a helix 32. The core 12 also comprises an interior housing 16 which extends through the head 20 and the body 30 along the axis X10. The cage 14 comprises a base 40, a torsion bar 50 and two arms 60. A proximal end is defined as being on the same side as the head 20 and the base 40, and a distal end is defined as being on the opposite side to the head 20 and the base 40. The bar 50 is introduced into the housing 16 while the head 20 is positioned in the base 40, as the clip 10 is being assembled.

As shown in FIGS. 8 to 10, the head 20 comprises a main part 21, a collar 22, a connecting part 23, and an interior cavity 24. The parts 21 and 23 each have a cylindrical shape, with the part 23 having a slightly smaller diameter. The main part 21 supports the collar 22 and two stop members 25, detailed hereinafter. The collar 22 is in the shape of a disk and is situated at the distal end of the head 20. The collar 22 comprises two protuberances 29 on its distal face, these being designed to collaborate with the base 40. The connecting part 23 is interposed between the part 21 and the body 30. The cavity 24 opens onto the proximal side of the head 20. The cavity 24 is designed to accept a tool, for example a cross-head screwdriver, for detaching the panel 2 from the support 3. The clip 10 may be fitted simply by manual pressure on the head 20 or on the panel 2 itself, as detailed hereinafter. The tool is of use only for dismantling.

Each stop member 25 comprises a radial portion 26 and two longitudinal stop elements 27. The radial portion 26 partially forms a ring around the main part 21, radially to the axis X10. More specifically, the annular portion 26 extends over 120 degrees about the axis X10. As an alternative, the annular portion 26 may extend over between 115 and 135 degrees about the axis X10. This angle between the stop elements 27 is dependent particularly on the angle of rotation of the helix 32.

The radial portion 26 is situated on the distal side of the main part 21, at the limits of the connecting part 23. The stop elements 27 extend along the main part 21, parallel to the axis X1, from the limits of the connecting part 23 and the ends of the radial portion 26. The stop elements 27 finish approximately mid-way up the height of the main part 21, without reaching the collar 22. Between the radial portion 26 and the stop elements 27, each stop member 25 delimits a housing to receive a complementary stop element 47 belonging to the base 40.

As shown in particular in FIGS. 4 to 10, the body 30 has an external profile in the form of a helix 32, having a given helix pitch. The helix 32 tapers on each side of a plane of inflection P32 transverse to the central axis X10. In other words, the helix 32 has a maximum width in the plane of inflection P32 and its width diminishes with increasing distance away from this plane P32. In the example of the figures, the plane P32 is perpendicular to the axis X10. The angle of rotation of the helix 32 about the axis X10 may be comprised between 35 and 55 degrees.

Figure 6:
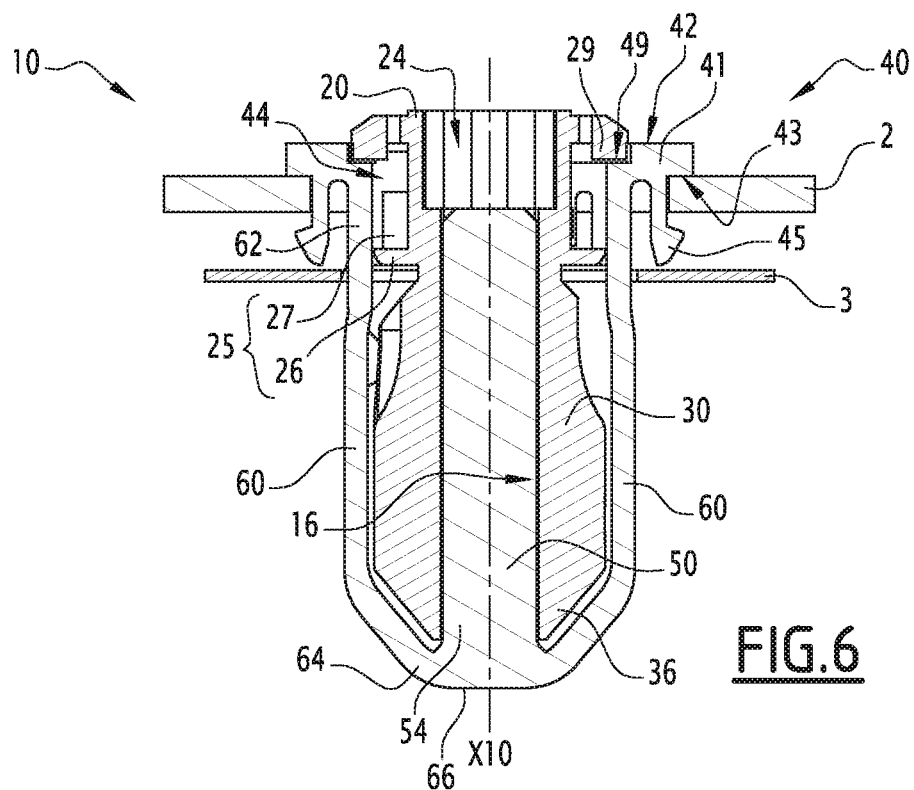
FIG. 6 is a view in section on line VI-VI of FIG. 5.
Figure 7:
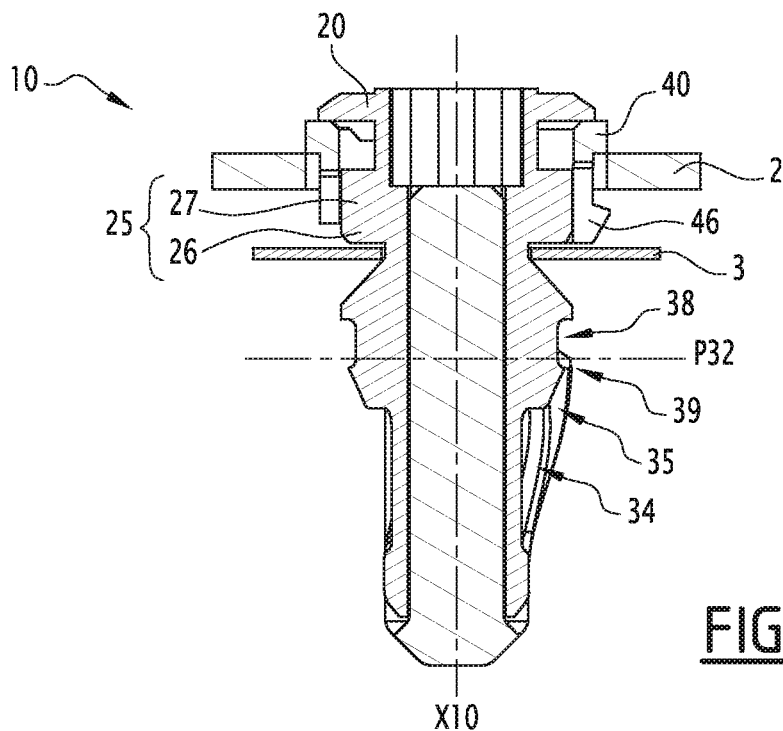
FIG. 7 is a view in section on line VII-VII of FIG. 6.
Figure 14:
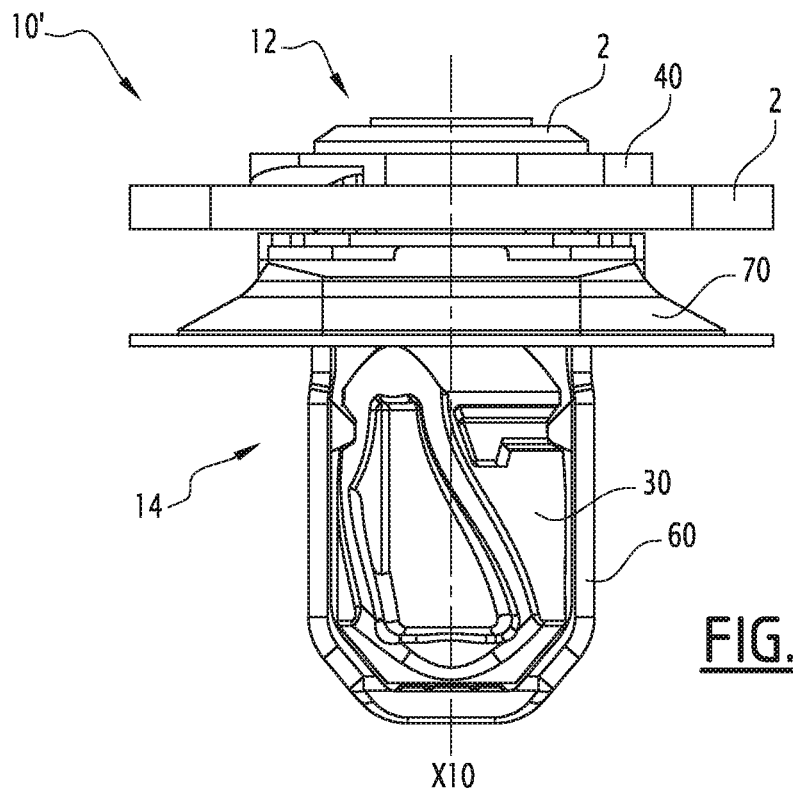
FIG. 14 is a view similar to FIG. 4, showing a second embodiment of a clip according to the invention, comprising a collar for sealing against the support.
Figure 15:
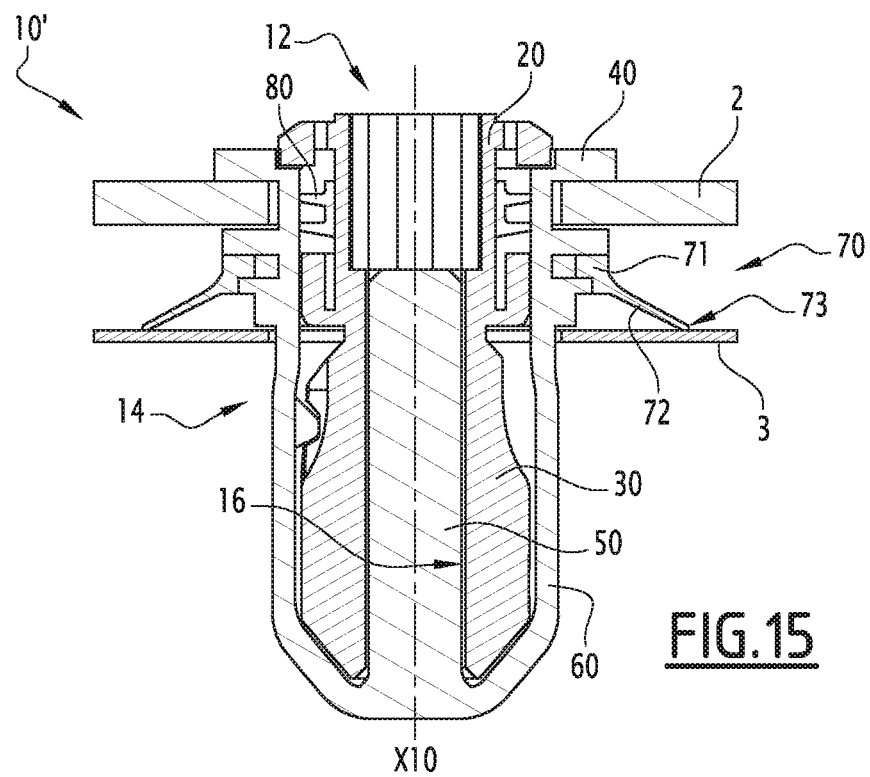
FIG. 15 is a section similar to FIG. 6, showing the clip of FIG. 14.
Figure 16:
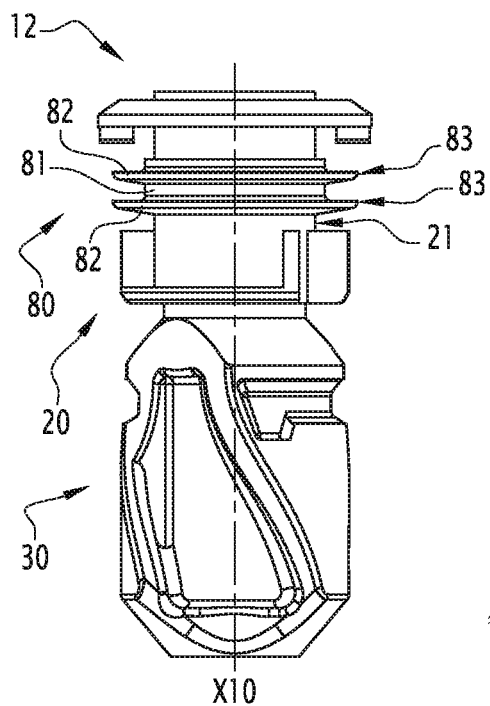
FIG. 16 is a view similar to FIG. 9, showing the core of the clip of FIG. 14.
Figure 17:
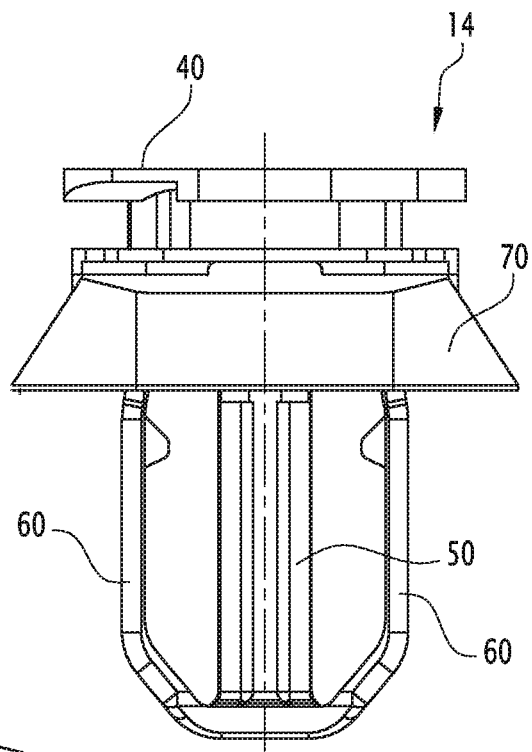
FIG. 17 is a view similar to FIG. 12, showing the cage of the clip of FIG. 14.
Figure 18:
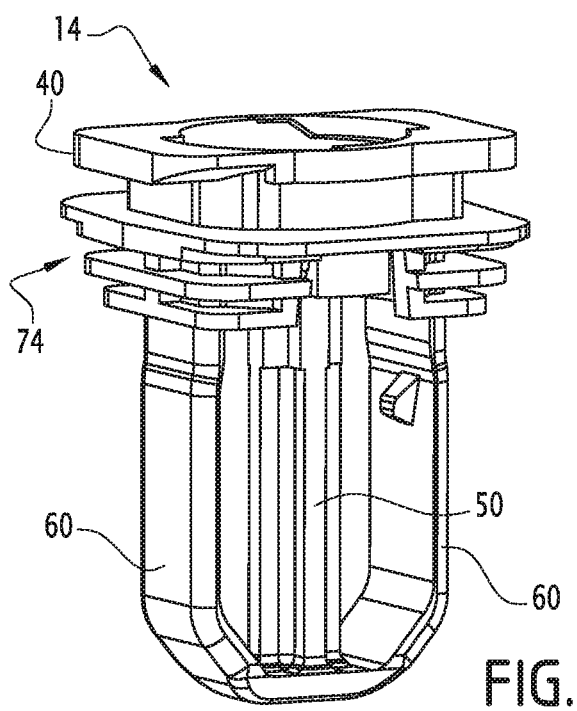
FIG. 18 is a perspective view showing the cage of FIG. 17, with the collar not depicted.
Figure 19:
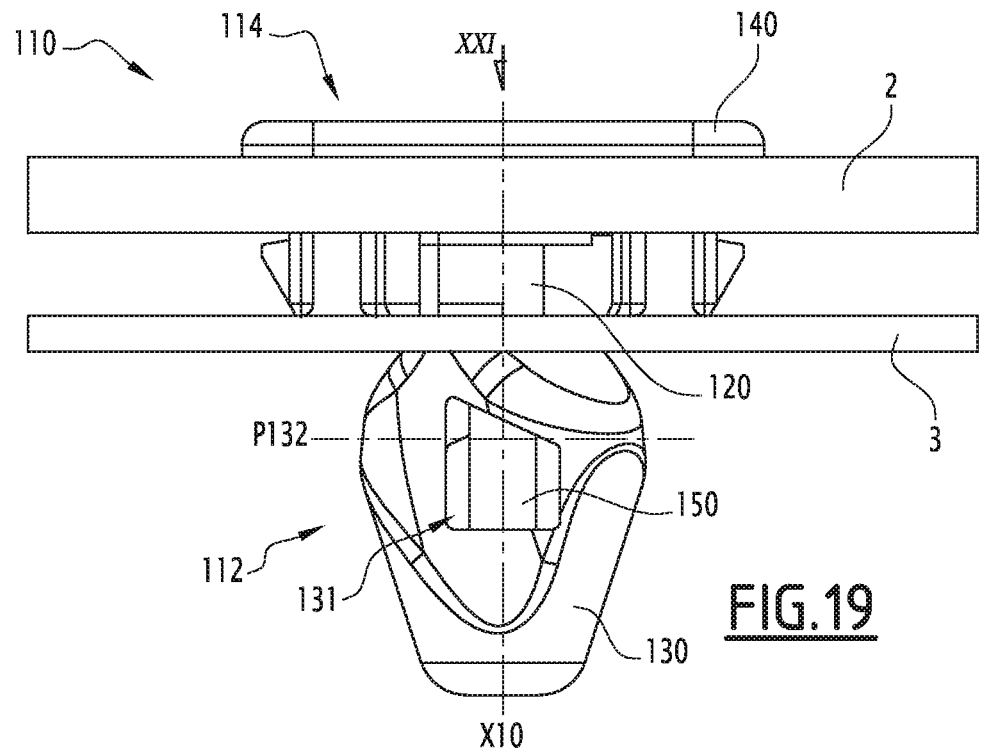
FIG. 19 is a view similar to FIG. 4, on a larger scale, showing a third embodiment of a clip according to the invention.

About the axis X10, the helix 32 comprises two raised portions 33 and two hollow portions 34 which are intercalated between the raised portions 33. The raised portions 33 and the hollow portions 34 are in pairs facing one another, radially to the axis X10. Where each raised portion 33 meets each hollow portion 34, the helix 32 comprises a ridge or edge 35 designed to slide against the support 3, as detailed hereinafter. The helix 32 comprises a distal end 36 and a proximal end 37, each having a shape that converges with increasing distance away from the plane P32. The housing 16 opens from the core 12 into the cavity 24 and at the distal end 36, as shown in FIG. 6.

The body 30 also comprises two diametrically opposed slots 38 which are formed in the raised portions 33 and open to the outside of the body 30. Each slot 38 has an annular shape and is designed to receive a lug 68 formed on one of the arms 60. The slot 38 comprises an indentation 39 situated at the level of the plane of inflection P32. The slot 38 opens onto the indentation 39 and is closed on the opposite side from the indentation 39.

The base 40 comprises a plate 41 having a proximal surface 42 and a distal surface 43. This surface 43 is designed to bear against the surface 2a of the panel 2. The base 40 further comprises an interior cavity 44 of cylindrical overall shape centered on the axis X1. When the clip 10 is assembled, the head 20 is arranged in the cavity 44, surrounded by the base 40.

The base 40 comprises a number of hooks 45, 46 and 47, which are elastically deformable and extend in the distal direction from the surface 43. The two hooks 45 are positioned one on each side of the arms 60, facing outwards. The two hooks 46 are each positioned next to one of the arms 60, facing outward. The two hooks 47 are each positioned next to one of the arms 60, facing inward and therefore toward the cavity 44. The hooks 46 and 47 are intercalated between the arms 60 about the axis X10.

In practice, the hooks 45 and 46 allow the base 40 to be clipped to the panel 2 by to passing through the orifice 2c. More specifically, the hooks 45 pass through the lateral parts 2e of the orifice 2, whereas the hooks 46 pass through the central part 2d. In this way, the hooks 45 and 46 form means of axial retention of the base 40 in relation to the support 3.

For their part, the hooks 47 form stop elements designed to be received in the stop members 25 and thus collaborate with the stop elements 27 of the head 20. The angle of the helix 32 determines the angle between the stop elements 27, as well as the dimensions and position of the stop elements 47.

The base 40 furthermore comprises two diametrically opposed slots 49 formed at the limit of the surface 42 and of the cavity 45. Each slot 49 comprises an incline 49a, a projection 49b and a boss 49c. The slots 49 are designed to receive the protuberances 29 formed on the collar 22. When the clip 10 is locked, the protuberances 29 are positioned against the incline 49a. As the clip 10 is unlocked, the turning of the tool positioned in the cavity 24 causes the protuberances 29 to slide in the slots 49 along the incline 49a as far as the boss 49c via the projection 49b. That causes the core 12 to rise back up along the vertical axis X10 then holds the core 12 in the unlocked position for the time needed for the panel 2 to be detached from the support 3.

The bar 50 is in the shape of a cross with four branches 51, when viewed in cross section in a plane perpendicular to the axis X10. The bar 50 extends along the axis X10 between a proximal end 52 close to the base 40 and a distal end 54 distant from the base 40. The bar 50 is housed in the core 12, more specifically in the housing 16 provided for that purpose. The bar 50 is therefore housed in the body 30 and partially in the head 20 of the core 12. As shown in FIG. 10, the housing 16 also has the shape of a cross with four branches 17, when viewed in cross section in a plane perpendicular to the axis X10. In other words, the core 12 and the torsion bar 50 comprise complementary means 17 and 51 for securing in terms of rotation about the central axis X10. In practice, the bar 50 may be deformed elastically during a rotation R1 or R2 of the core 12 about the axis X10.

The arms 60 extend on each side of the bar 50, connecting the base 40 and the bar 50. Each arm 60 extends between a proximal end 62 connected to the plate 41 of the base 40 and a distal end 64 connected to the distal end 54 of the bar 50. At their ends 64, the arms 60 flex and meet at a portion 66 secured to the end 54. Each arm 60 extends roughly in the longitudinal direction of the clip 10, parallel to the axis X10, except at the end 64. Each arm 60 comprises a lug 68 formed on the inside and designed to be received in a slot 38 of the body 30.

The way in which the clip 10 is implemented is detailed hereinafter.

The method comprises a preparatory phase a) which consists in bringing the panel 2 and the support 3 closer together. In general, the support 3 is fixed, whereas the panel 2 is able to move and can be manipulated by an operator. The panel 2 and the support 3 each comprise an orifice, 2c and 3c respectively, to receive the clip 10. At this stage, the core 12 and the cage 14 of the clip 10 are assembled.

According to a first embodiment a1) of the preparatory phase a), the clip 10 can be positioned on the panel 2 before the panel 2 and the support 3 are brought closer together. The clip 10 is inserted into the orifice 2c of the panel 2, generally by the automotive manufacturer that produces the panel 2. The manufacturer then delivers the panel 2, with pre-positioned clips 10, to the automobile assembly line.

According to a second embodiment a2) of the preparatory phase a), the clip 10 can be positioned on the panel 2 and the support 3, by being inserted through the orifices 2c and 3c after the panel 2 and the support 3 have been brought closer together.

The method next comprises a fastening phase b) which consists in progressively introducing the clip 10 through the orifice 3c in the support 3 until the clip 10 reaches a locked position. This fastening phase b) comprises successive steps detailed hereinafter.

In a first step b1), while the core 12 and the cage 14 are passing through the orifice 3c in the support 3, the raised portions 33 and the edges 35 of the helix 32 slide against the edges of the orifice 3c. A torque is created between the support 3 and the body 30. The rigid helix 32 is progressively made to turn upon contact with the support 3, in a first direction R1 of rotation about the axis X10, shown in FIG. 1. At the same time, the torsion bar 50 is elastically deformed about the axis X10, under the action of the complementary means 17 and 51 that secure the core 12 and the bar 10 against relative rotation about the axis X10. Rotation of the core 12 introduces torsion into the bar 50. As the base 40 and the arms 60 of the cage 14 are more rigid overall than the torsion bar 50, only this bar 50 twists.

At the same time, the stop members 25 pivot in relation to the hooks 47, the prominences 29 slide in the slots 49, and the slots 38 pivot in relation to the lugs 68. The complementary stop elements 27 and 47 limit the relative rotation between the head 20 and the base 40. The collar 22, the stop members 25 and the hooks 47, and also, to a lesser extent, the slots 38 and the lugs 68, form means of axial retention of the core 12 with respect to the cage 14.

In a second step b2), once the plane of inflection P32 of the helix 32 has passed through the orifice 3c in the support 3, the strain applied to the body 30 by the support 3 is suddenly released. Spring back occurs and the torsion bar 50 is elastically deformed until it returns to its initial configuration, thereby driving the core about the axis X10 in a second direction R2 of rotation that is the opposite of the first direction R1, as shown in FIG. 1. The spring back effect is afforded by the tapering shape of the helix 32.

The clip 10 is therefore in a locked position such that the panel 2 is fastened rigidly to the support 3. The shape of the helix 32 prevents accidental withdrawal of the clip 10 from the support 3. The clip 10 is clipped to the panel 2 by the hooks 45 and 46. The surface 43 of the plate 41 is positioned against the surface 2a of the panel 2.

In order to remove the clip 10, a tool provided for that purpose is inserted into the cavity 24. The tool turns the core 12 in the direction R1. The rotation of the head 20 with respect to the base 40 causes the protuberances 29 to slide along the slots 49, along the incline 49a as far as the boss 49c via the projection 49b so that the core 12 rises up along the vertical axis X10. The turning and rising of the core 12 allow the indentations 39 and the lugs 68 to be brought into coincidence, because of the operational clearance between the core 12 and the cage 14. The clip 10 is then kept in the unlocked position for the time needed to detach the panel 2 from the support 3.

FIGS. 14 to 18 depict a clip 10' according to a second embodiment of the invention.

Certain constituent elements of the clip 10' are identical to those of the clip 10 of the first embodiment described above and, for the sake of simplicity, bear the same numerical references. Only the differences between the clips 10 and 10' are described hereinafter, for the sake of simplicity.

The clip 10' comprises a core 12, a cage 14, a collar 70 and a sealing gasket 80.

The collar 70 comprises a base 71 and a lip 72 which are centered on the axis X10. The lip 72 extends form the base 71 as far as an end 73. The collar 70 has a frustoconical profile in cross section in a plane containing the axis X10. The collar 70 is fixed to the cage 14 and designed to press against the support 3. More specifically, the base 71 is fixed to an anchoring part 74 formed on the outside of the base 40. The end 73 of the lip 72 is designed to press against the surface 3a of the support 3.

The gasket 80 comprises a base 81 and two lips 82 centered on the axis X10. As an alternative, the gasket 80 may comprise a single lip 82 or more than two lips 82. The base 81 has an annular shape. Each lip 82 extends from the base 81 as far as an end 83. Each lip 82 has a frustoconical profile in cross section in a plane containing the axis X10. The gasket 80 is fixed to the core 12 and arranged to press against the cage 14. More specifically, the base 81 is fixed to the part 21 of the head 20. The end 83 of each lip 82 is arranged pressing against an internal surface of the base 40 delimiting the cavity 44.

Thus the collar 70 and the gasket 80 make it possible to improve sealing at the clip 10'.

In an alternative form which has not been depicted, the clip 10' may comprise a collar 70 but no gasket 80, or may comprise a gasket 80 but no collar 70.

FIGS. 19 to 24 depict a clip 110 according to a third embodiment of the invention.

Certain constituent elements of the clip 110 have an operation which is roughly similar, but a structure which differs, in comparison with the clip 10 of the first embodiment described hereinabove and bear the same numerical references increased by 100. Only the differences between the clips 10 and 110 are described hereinafter for the sake of simplicity.

The clip 110 comprises a core 112 and a cage 114, assembled with one another by overmolding. The core 112 comprises a head 120 and a body 130. The cage 114 comprises a base 140 and a torsion bar 150 that has no arms. A housing 116 for receiving the bar 150 is delimited in the body 130.

The head 120 comprises parts 121, 122 and 123 of cylindrical shape, and an interior cavity 124 formed through these parts 121, 122 and 123 along the axis X10. Two diametrically opposed stop elements 127 are fixed to the parts 122 and 123, at the level of the part 121 along the axis X10. A space separates the part 121 and each of the elements 127 radially to the axis X10. Just one of the elements 127 has been depicted in FIGS. 19, 22 and 23.

Figure 20:
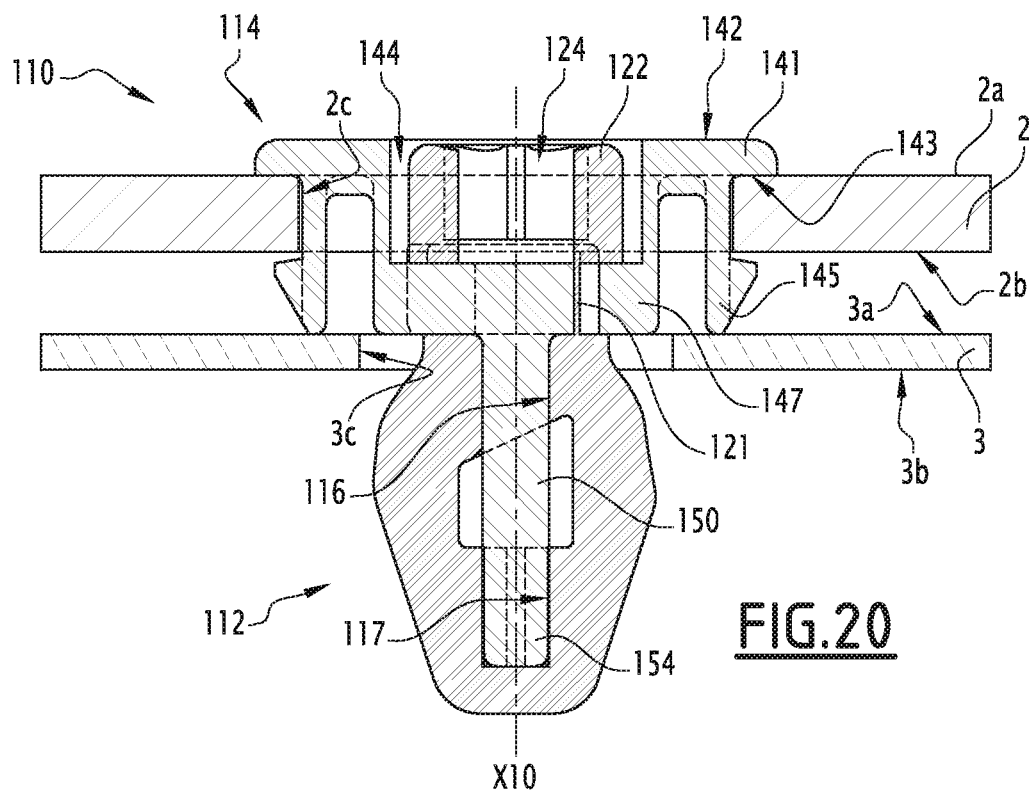
FIG. 20 is a section similar to FIG. 6, on a larger scale, showing the clip of FIG. 19.
Figure 21:
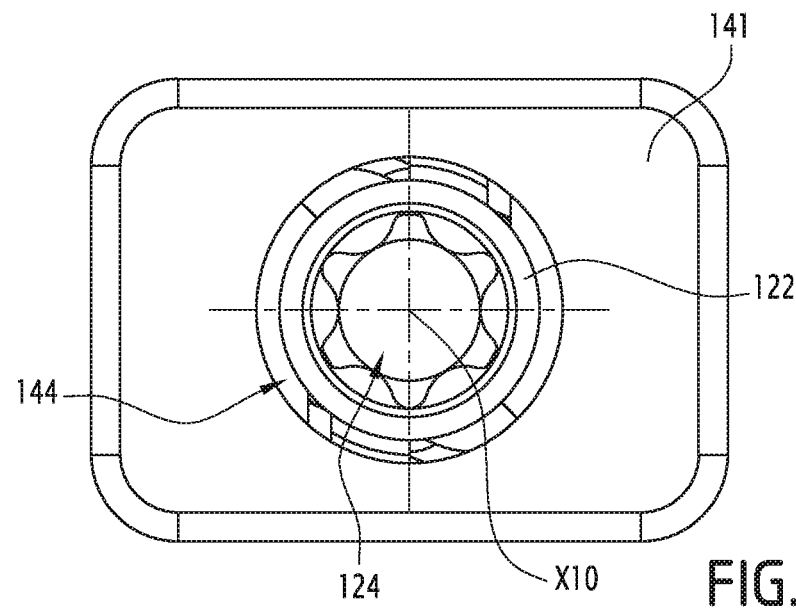
FIG. 21 is a view from above on arrow XXI of FIG. 19.
Figure 22:
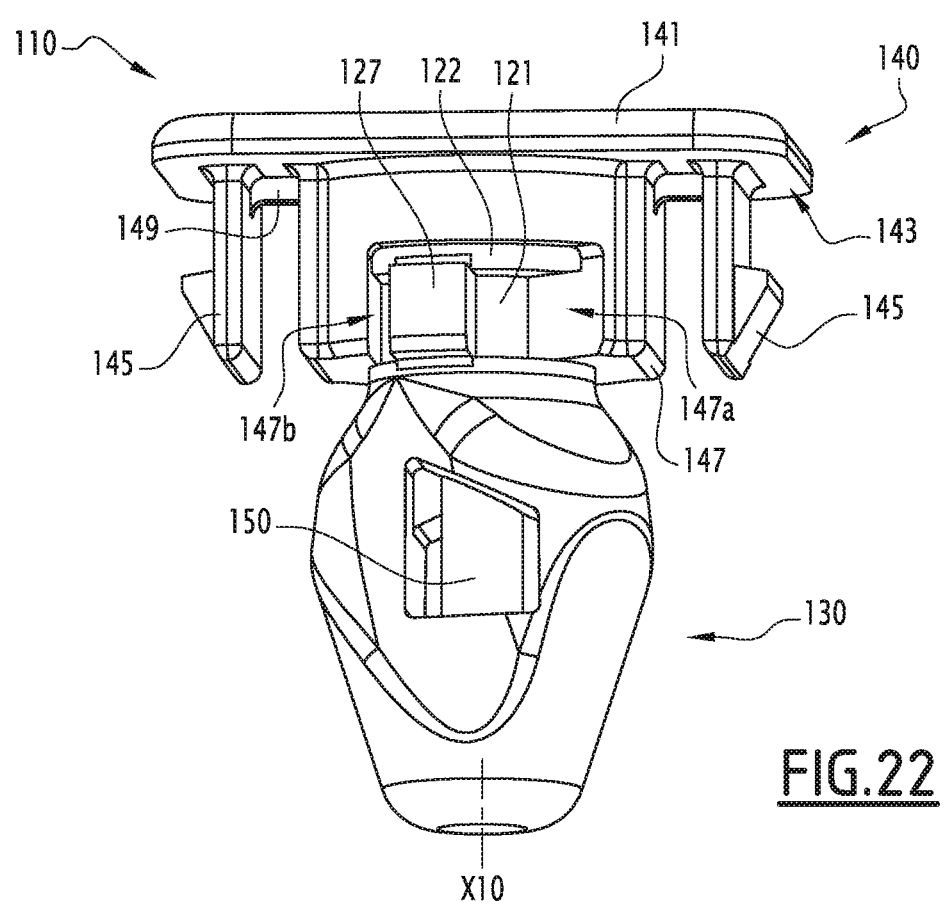
FIG. 22 is a perspective view showing the clip of FIG. 19, whereas the panel and the support are not depicted.
Figure 23:
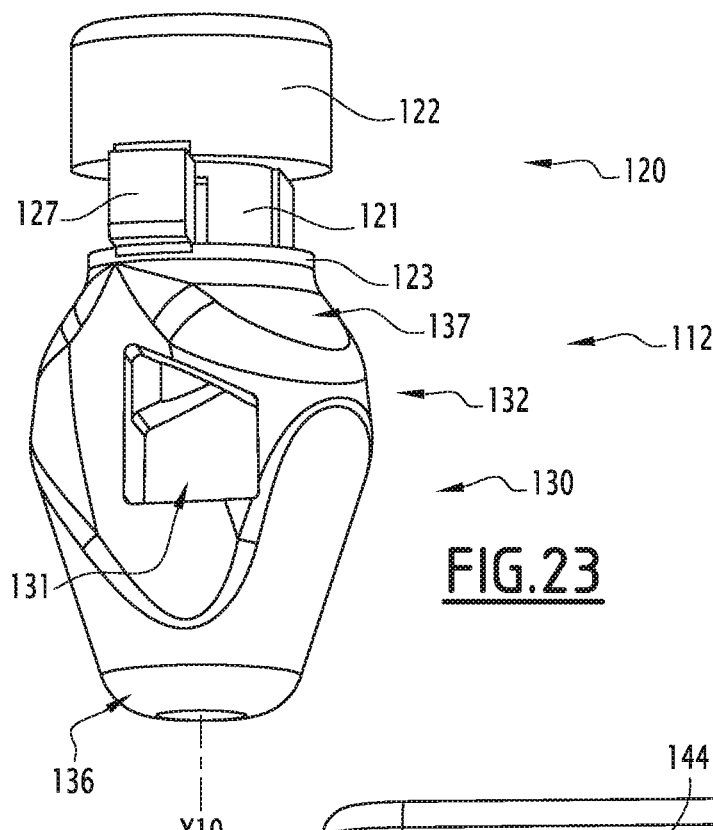
FIG. 23 is a perspective view analogous to FIG. 22, showing only the core of the clip.
Figure 24:
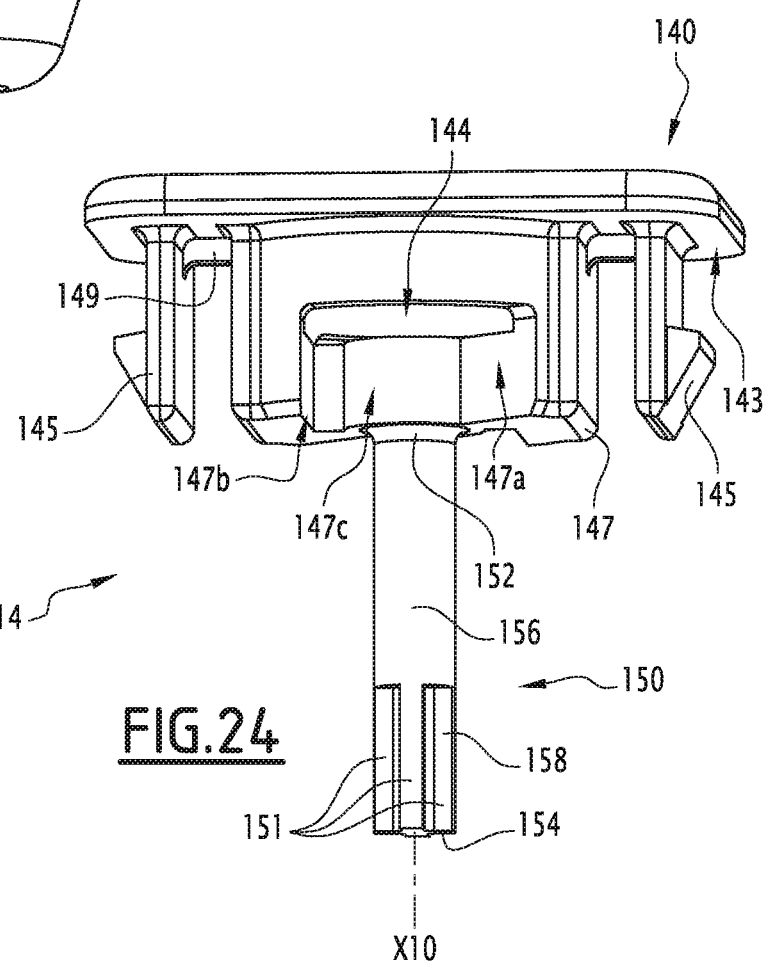
FIG. 24 is a perspective view analogous to FIG. 22, showing only the cage of the clip.

The body 130 has an external profile in the shape of a helix 132, which tapers on each side of a plane of inflection P132 transverse to the central axis X10. The body 130 is provided with two diametrically opposed orifices 131 connecting the housing 116 to the outside of the body 130. The bare 150 is visible in the body 130 through the orifices 131. The helix 132 comprises a distal end 136 and a proximal end 137, each end having a shape that converges with increasing distance away from the plane P32. The housing 116 opens from the core 112 into the cavity 124 but does not open at the distal end 36, as shown in FIG. 20.

The base 140 comprises a plate 141 provided with a proximal surface 142 and distal surface 143. The base 140 comprises an internal cavity 144 receiving the head 120. The base 140 comprises hooks 145 for clipping onto the panel 2. The base 140 comprises a hollow block 147 which extends in the distal direction from the surface 143. The cavity 144 is delimited in the plate 141 and the block 147. The block 147 has faces 147a and 147b formed facing each other. The element 127 can come to bear against the face 147a. In other words, the block 147 forms a stop element that complements the element 127. The part 121 of the head 120 is mounted with the ability to pivot about a central cylindrical part 147c of the block 147. Stiffening ribs 149 connect the hooks 145 to the block 147.

The bar 150 extends between a proximal end 152 and a distal end 154. The bar 150 comprises a cylindrical portion 156 at the same end as the proximal end 152 and a cross-shaped portion 158 at the same end as the proximal end 154. The portion 158 has the shape of a cross with four branches 151, in cross section in a plane perpendicular to the axis X10. The portion 156 measures approximately two-thirds of the length of the bar 150, whereas the portion 158 measures approximately one-third of the length of the bar 150, along the axis X10. The housing 116 comprises a cylindrical proximal portion receiving the portion 156 and a cross-shaped distal portion receiving the portion 158 of the bar 150. The distal portion of the housing 116 is in the shape of a cross with four branches 117, viewed in cross section in a plane perpendicular to the axis X10. In other words, the core 112 and the torsion bar 150 comprise complementary means 117 and 151 securing them in terms of relative rotation about the central axis X10.

The way in which the clip 110 works is comparable to the way in which the clip 10 works as described above. The clip 110 is, however, more compact, and more resistant to pulling-out than is the clip 10.

Furthermore, the clip 10, 10' or 110 can be configured differently from the FIGS. 1 to 24 without departing from the scope of the invention.

In an alternative form which has not been depicted, the complementary means 17+51/117+151 that secure the core 12/112 and the torsion bar 50/150 in terms of relative rotation about the central axis X10 may be configured differently from the figures. For example, the housing 16/116 and the bar 50/150 may have a triangular shape.

According to another alternative form which has not been depicted, the clip 10 has no protuberances 29 or slots 49. The clip 10 is unlocked through the action of the tool. The torsion applied by the tool to the torsion bar 50 creates a force of extracting the clip 10 and the panel 2 in relation to the support 3.

Furthermore, the technical features of the various embodiments and alternative forms of embodiment mentioned hereinabove may, in respect of all or just some of them, be combined with one another. Thus, the clip may be adapted in terms of cost, compactness and performance.

The invention claimed is:

1. A clip for fastening a panel on a support, in particular for an automobile equipment, in which:
   the clip comprises a core and a cage forming two distinct parts centered on a central axis;
   the core includes a head and a body; wherein:
   the body has an outer profile forming a helix, tapered on either side of an inflection plane transverse to the central axis;
   the cage includes a base, surrounding the head, and a torsion bar, housed in the core;
   the core and the torsion bar include complementary means for rotational securing around the central axis; and
   the torsion bar is elastically deformed during a rotation of the core around the central axis.

2. The clip according to claim 1, wherein the head of the core and the base of the cage include complementary stop elements, limiting the relative rotation between the head and the base, while the torsion bar is elastically deformed and the core pivots around the central axis.

3. The clip according to claim 1, wherein the helix comprises raised portions and hollow portions that are connected by edges provided to slide against the support.

4. The clip according to claim 1, wherein the base includes hooks for clipping on the support.

5. The clip according to claim 1, wherein it includes a sealing collar fastened to the cage and provided to bear against the support.

6. The clip according to claim 1, wherein it includes a sealing gasket fastened to the core and positioned bearing against the cage.

7. The clip according to claim 1, wherein the cage comprises at least one arm, preferably two arms, connecting the base to a distal end of the torsion bar.

8. The clip according to claim 7, wherein the body of the core includes at least one slot provided to receive a lug formed on the arm or least one of the arms, preferably the body includes two slots provided each to receive a lug formed on one of the two arms.

9. A method for implementing a clip according to claim 1, wherein the method comprises the following successive phases:
   a) a preparatory phase consisting of bringing a panel and a support closer together, each of them including an orifice for receiving the clip, which is inserted into the orifice of the panel;
   b) a fastening phase consisting of inserting the clip through the orifice of the support, this fastening phase comprising the following successive steps:
   b1) while the core passes through the orifice of the support, the helix is wound in contact with the support in a first direction of rotation around the central axis and the torsion bar is elastically deformed around the central axis;
   b2) once the inflection plane of the helix has passed through the orifice of the support, the torsion bar is elastically deformed until returning to its initial configuration, while driving the core in a second direction opposite the first direction of rotation around the central axis.

10. An automobile equipment, comprising at least: a support; a panel provided to be fastened to the support; and a clip according to claim 1.

* * * * *